US008112526B2

United States Patent
Barsness et al.

(10) Patent No.: US 8,112,526 B2
(45) Date of Patent: Feb. 7, 2012

(54) PROCESS MIGRATION BASED ON SERVICE AVAILABILITY IN A MULTI-NODE ENVIRONMENT

(75) Inventors: Eric L. Barsness, Pine Island, MN (US); David L. Darrington, Rochester, MN (US); Amanda E. Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/145,219

(22) Filed: Jun. 24, 2008

(65) Prior Publication Data

US 2009/0320023 A1 Dec. 24, 2009

(51) Int. Cl.
*G06F 15/173* (2006.01)
(52) U.S. Cl. .................. 709/226; 709/223; 718/105
(58) Field of Classification Search .......... 709/223–226, 709/201; 718/105
See application file for complete search history.

(56) References Cited

U.S. PATENT DOCUMENTS

| 5,978,829 | A  | * | 11/1999 | Chung et al. ............ 718/102 |
| 6,886,035 | B2 | * | 4/2005  | Wolff .................... 709/219 |
| 7,080,145 | B2 | * | 7/2006  | Srivastava et al. ........ 709/226 |
| 7,082,604 | B2 | * | 7/2006  | Schneiderman ........... 718/100 |
| 2003/0126200 | A1 | * | 7/2003 | Wolff .................... 709/203 |
| 2005/0027862 | A1 | * | 2/2005 | Nguyen et al. ........... 709/225 |
| 2006/0259799 | A1 | * | 11/2006 | Melpignano et al. ...... 713/300 |
| 2007/0192157 | A1 | * | 8/2007 | Gooch .................... 705/9 |
| 2007/0226342 | A1 | * | 9/2007 | Apelbaum ............... 709/226 |
| 2007/0233870 | A1 | * | 10/2007 | Goto et al. .............. 709/226 |
| 2008/0066073 | A1 | * | 3/2008 | Sen ....................... 718/105 |
| 2008/0256223 | A1 | * | 10/2008 | Chan et al. .............. 709/223 |
| 2008/0256229 | A1 | * | 10/2008 | Birnbaum et al. ........ 709/224 |

OTHER PUBLICATIONS

Eric L. Barsness, et al., U.S. Patent Application Entitled, "Process Migration Based on Exception Handling in a Multi-Node Environment,".

* cited by examiner

*Primary Examiner* — Faruk Hamza
(74) *Attorney, Agent, or Firm* — Peterson & Sheridan LLP

(57) ABSTRACT

A process on a highly distributed parallel computing system is disclosed. When a first compute node in a first pool is ready to hand-off a task to second pool for further processing, the first compute node may first determine whether a node is available in the second pool. If no node is available from the second pool, then the first compute node may begin performing a primary task assigned to the second pool of nodes, up to the point where a service available exclusively to the nodes of the second pool is required. In the interim, however, one of the nodes of the second pool may become available. Alternatively, an application program running on a compute node may be configured with an exception handling routine that catches exceptions and migrates the application to a compute node where a necessary service is available, as such exceptions occur.

21 Claims, 7 Drawing Sheets

PROCESS MIGRATION BASED ON SERVICE AVAILABILITY IN A MULTI-NODE ENVIRONMENT

BACKGROUND OF THE INVENTION

1. Field of the Invention

The present invention generally relates to data processing and more particularly to a method for process migration based on service availability in a multi-node environment.

2. Description of the Related Art

Powerful computers may be designed as highly parallel systems where the processing activity of hundreds, if not thousands, of processors (CPUs) are coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

In a multi-node or highly distributed environment, security can be implemented by assigning tasks or jobs to a certain set of nodes that are within the cluster. In a massively parallel computing system, like a Blue Gene system, it is often necessary to assign pools of nodes to perform different tasks. For example, a database application might assign a first nodal pool to receive and database requests to a second nodal pool configured to perform manipulation on a data set. Carrying on with this example, a third nodal pool could be tasked with writing any results to the database.

SUMMARY OF THE INVENTION

One embodiment of the invention includes a computer-implemented method of migrating processes on a parallel computing system having a plurality of compute nodes. The method may generally include assigning a first primary task to a first nodal pool, and assigning a second primary task to a second nodal pool. The first and second nodal pools each include a specified number of compute nodes, where each compute node in the first nodal pool is available to perform (i) the first primary task and (ii) at least a portion of the second primary task. Also, the second primary task requires access to a service available to each compute node included in the second nodal pool. In response to receiving a computing request, the first primary task may be performed by a first compute node of the first nodal pool. Upon performing the first primary task, it is determined whether a compute node of the second nodal pool is available to perform the second primary task. And upon determining a compute node of the second nodal pool is not available, the first compute node may perform at least the portion of the second primary task.

Another embodiment of the invention includes computer-readable storage medium containing a program which, when executed performs an operation for migrating processes on a parallel computing system having a plurality of compute nodes. The operation may generally include assigning a first primary task to a first nodal pool and assigning a second primary task to a second nodal pool. The first and second nodal pools each include a specified number of compute nodes, where each compute node in the first nodal pool is available to perform (i) the first primary task and (ii) at least a portion of the second primary task. Also, the second primary task requires access to a service available to each compute node included in the second nodal pool. In response to receiving a computing request, the first primary task may be performed by a first compute node of the first nodal pool. Upon performing the first primary task, it is determined whether a compute node of the second nodal pool is available to perform the second primary task. And upon determining a compute node of the second nodal pool is not available, the first compute node may perform at least the portion of the second primary task.

Still another embodiment of the invention includes a parallel computing system having a plurality of compute nodes, each having at least a processor and a memory and a service node having at least a processor and a memory. The service node may be configured to assign a first primary task to a first nodal pool and to assign assigning a second primary task to a second nodal pool. Also, the first and second nodal pools each include a specified number of compute nodes, where each compute node in the first nodal pool is available to perform (i) the first primary task and (ii) at least a portion of the second primary task. Further, the second primary task requires access to a service available to each compute node included in the second nodal pool. The system also includes a first compute node, assigned to the first nodal pool, wherein the first compute node executes a program. When executed on the processor of the first compute node, the program is configured to perform the first primary task, in response to receiving a computing request. Upon performing the first primary task, it is determined whether a compute node of the second nodal pool is available to perform the second primary task. And upon determining a compute node of the second nodal pool is not available, the first compute node may perform at least the portion of the second primary task.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
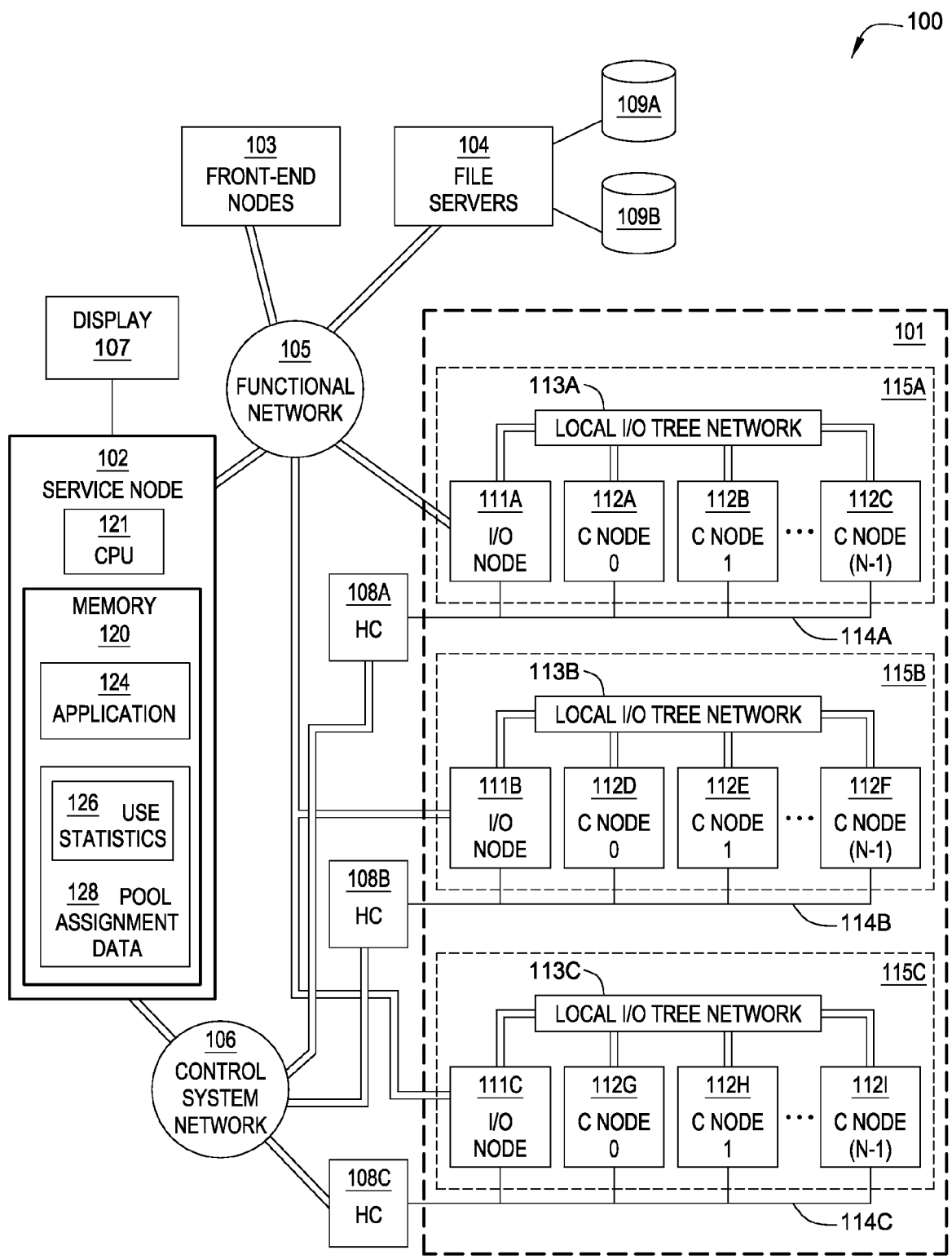
FIG. 1 is a block diagram illustrating components of a massively parallel computer system, according to one embodiment of the present invention.

Embodiments of the invention provide a method, article and system to migrate a process on a highly distributed parallel computing system to take advantage of unused system resources in other nodal pools without disrupting the system's configuration. In cases where a process' destination node is unavailable or busy, embodiments of the invention allow the system to utilize idle nodes to perform the required task. Further, the system may collect statistics used to predict how to distribute nodes to different nodal pools.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that may be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 112, migrate process running on one of compute nodes 112 to another one of compute nodes 112, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

Illustratively, memory 120 of service node 102 includes an application 124, a container for nodal-use statistics 126, and a pool assignment data container 128. Information relating to the migration process is collected and stored in nodal-use container 126. Application 124 may be configured to communicate with a distributed application running on compute core 101. For example, consider an in-memory database where one pool of compute nodes each stores a different portion of database data. In such a case, application 124 may be used to direct database requests (e.g., queries) to a node in a first group of nodes configured to receive such requests. And in response, one of the receiving nodes could process the query and broadcast it to a second pool of nodes storing the in-memory database. In turn, each such node in the second pool could evaluate the query against the portion of database data on that node. Further, results from query processing could be forwarded to a third group of nodes configured to access a disk-based database to write any changes to records stored by the database (based on the processing of the second group of nodes). Similarly, if the query requested information (without making any changes), query results could be passed to a fourth group of nodes configured to generate presentation results for a user. Of course, one of ordinary skill in the art will recognize that the example of a database is but one of many applications which may be executed on a massively parallel system.

As described in greater detail below, when one of the nodes (e.g., one of the database nodes in the second pool) is ready to transmit results to a node in the third pool of nodes (configured to actually write to the database), situations may occur where no node is available in the third pool. In one embodiment, in response, the node of the second pool (i.e., the node actually performing the database request) may begin performing the functions of the third pool of nodes up to the point where access to the database is actually required. At such a point, one of the database nodes may have become available. When this occurs, the process may be migrated to one of the database nodes and continue executing. In an alternative embodiment, the application running on the compute nodes may be configured with an exception handling routine that catches an exception and migrates a running process to a node where a necessary service is available.

In one embodiment, the pool assignment data 128 may identify a primary task assigned to each pool of compute nodes. The use statistics 126 collects information relating to the migration of process on all nodal pools. Such information may includes the time to migrate, execution time of unit work, CPU requirements, start up time, execution environment run time-characteristics, and other statistics. In one embodiment, these statistics are used to more efficiently allocate system resources by allowing programmers and system administrators to analyze the information to redistribute nodes and/or redefine nodal pools to better serve the needs of the applications using the system. For example, application 124 may be configured to manage what nodes are assigned to a given pool, as well as to monitor the utilization of the nodes assigned to a given pool. Thus, if one node pool is frequently being fully utilized, causing nodes in other pools to wait for available nodes in that pool, the application 124 may reassign nodes from one such pool to another.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
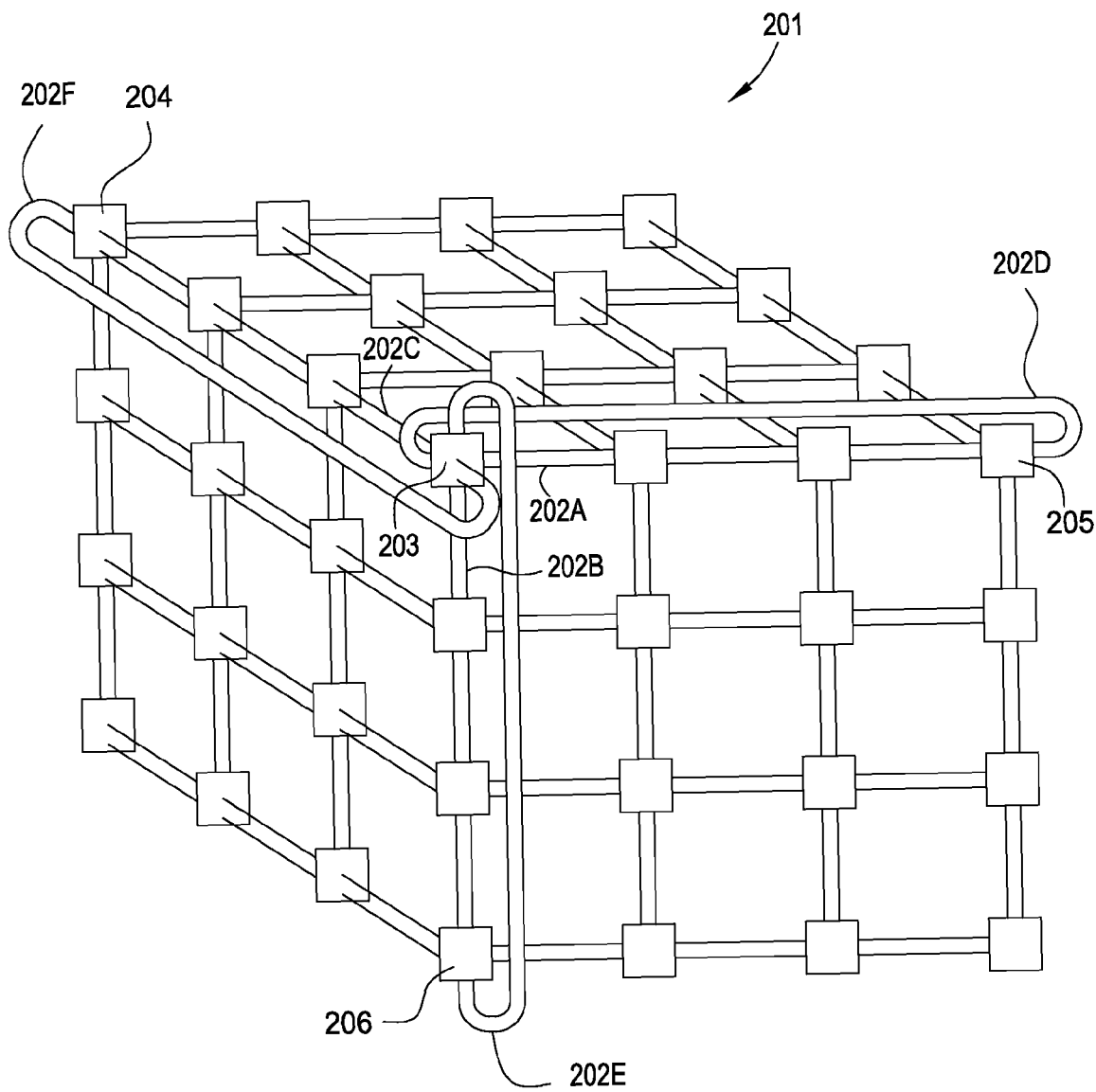
FIG. 2 is an illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it is understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although in some cases it may be desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of torus 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
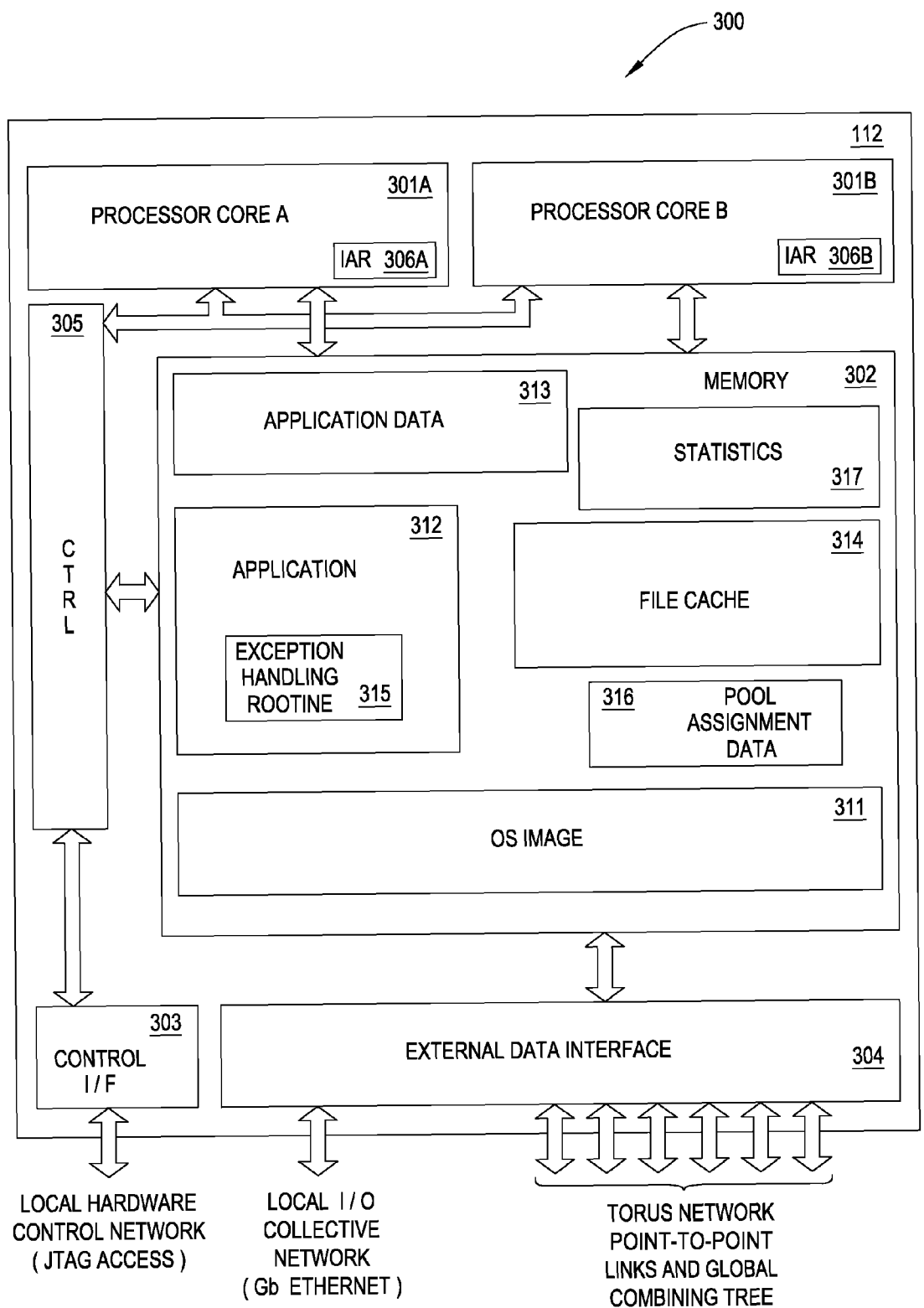
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 111, and each I/O node 111 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, user application data 313, pool assignment data 316, and use statistics 317. Illustratively, memory 302 also includes a file cache 314, i.e., a cache of data read from or to be written to an I/O file. Operating system image 311 provides a copy of a simplified-function operating system running on compute node 112, referred to as a compute node kernel. Operating system image 311 may include a minimal set of functions required to support operation of the compute node 112.

Figure 6:
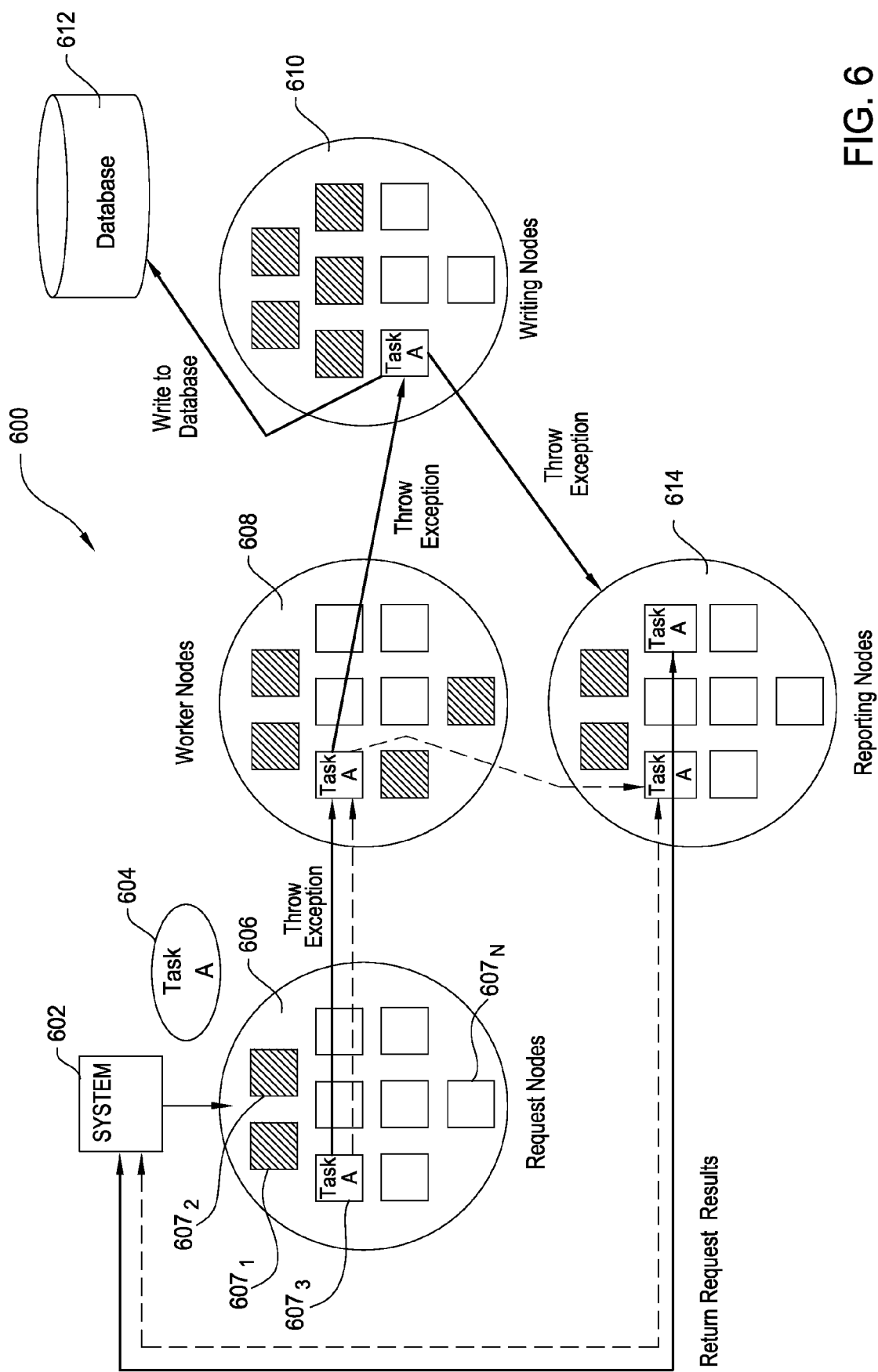
FIG. 6 illustrates another example of a process being migrated from one compute node to another, according to one embodiment of the invention.
Figure 7:
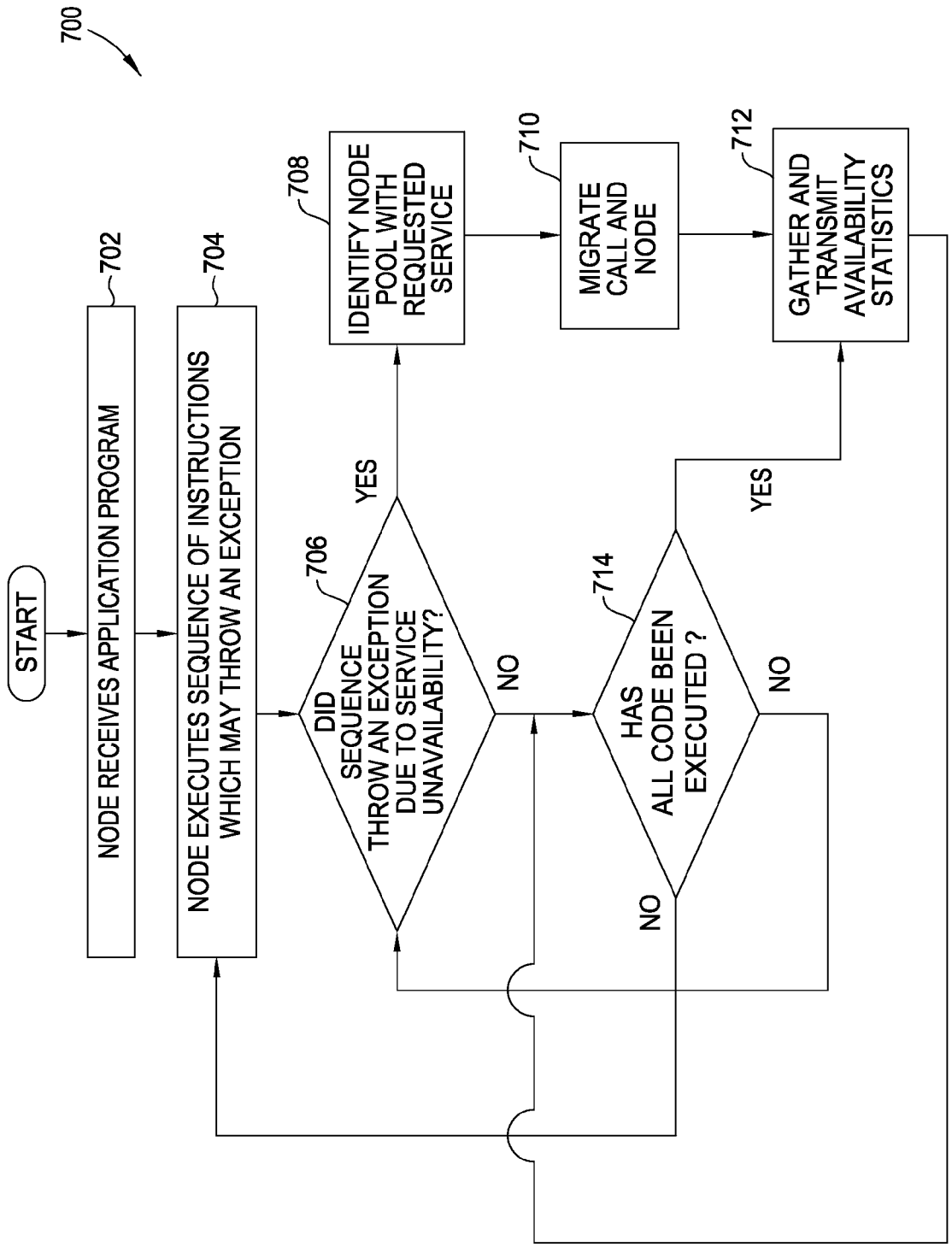
FIG. 7 is a flow diagram illustrating a method for migrating a process from one compute node to another request based on the service availability and location, according to one embodiment of the invention.

Application 312 represents the program being executed by the compute node 112. The application 312 may be a fragment of a larger application or a complete application unto itself. In addition, the node 112 may execute the application 312 until throwing an exception. In one embodiment, an exception handling routine 315 may be configured to catch and process the exception event. For example, the exception handling routine 315 may be configured to catch exceptions thrown when a service needed by application 312 is not available from compute node 112, and in response, to identify a node (or pool of nodes) which provide the needed service, and to migrate the application 312 to that node (or a node from that pool). Once migrated, the application 312 may retry executing the statements that caused the exception in the first place. FIGS. 6 and 7 described below, provide examples of how the exception handling routine 315 may be configured to catch and process exceptions based on service availability at a given compute node.

As part of ongoing operations, application 312 may be configured to transmit messages from compute node 112 to other compute nodes in parallel system 100. For example, the MPI call of MPI_Send( ); may be used by application 312 to transmit a message from one compute node to another. On the other side of the communication, the receiving compute node may use the MPI call MPI_Receive( ); to receive the message. For example, in context of the present invention, one compute node may use MPI messages to send a request to another a compute for a needed program fragment. As described above, in a Blue Gene system, the external data communications interface 304 transmits the MPI message by encapsulating it within a set of packets and transmitting the packets of over the torus network of point-to-point links. Other parallel systems and other parallel computing libraries use similar mechanisms for transmitting messages between different compute nodes. similar mechanisms for transmitting messages between different compute nodes.

The pool assignment data structure 316 may identify the pool assignment information for the pool to which a given node is assigned. In addition, the statistics data structure 317 stores the performance statistics of the local nodal pool such as time to migrate, processor requirements, and other runtime statistics. In some embodiments, these statistics are used to more efficiently distribute or allocate system resources by allowing programmers and system administrators to analyze the information in order to redistribute nodes and/or redefine nodal pools to better serve the needs of the applications using the system.

Figure 4:
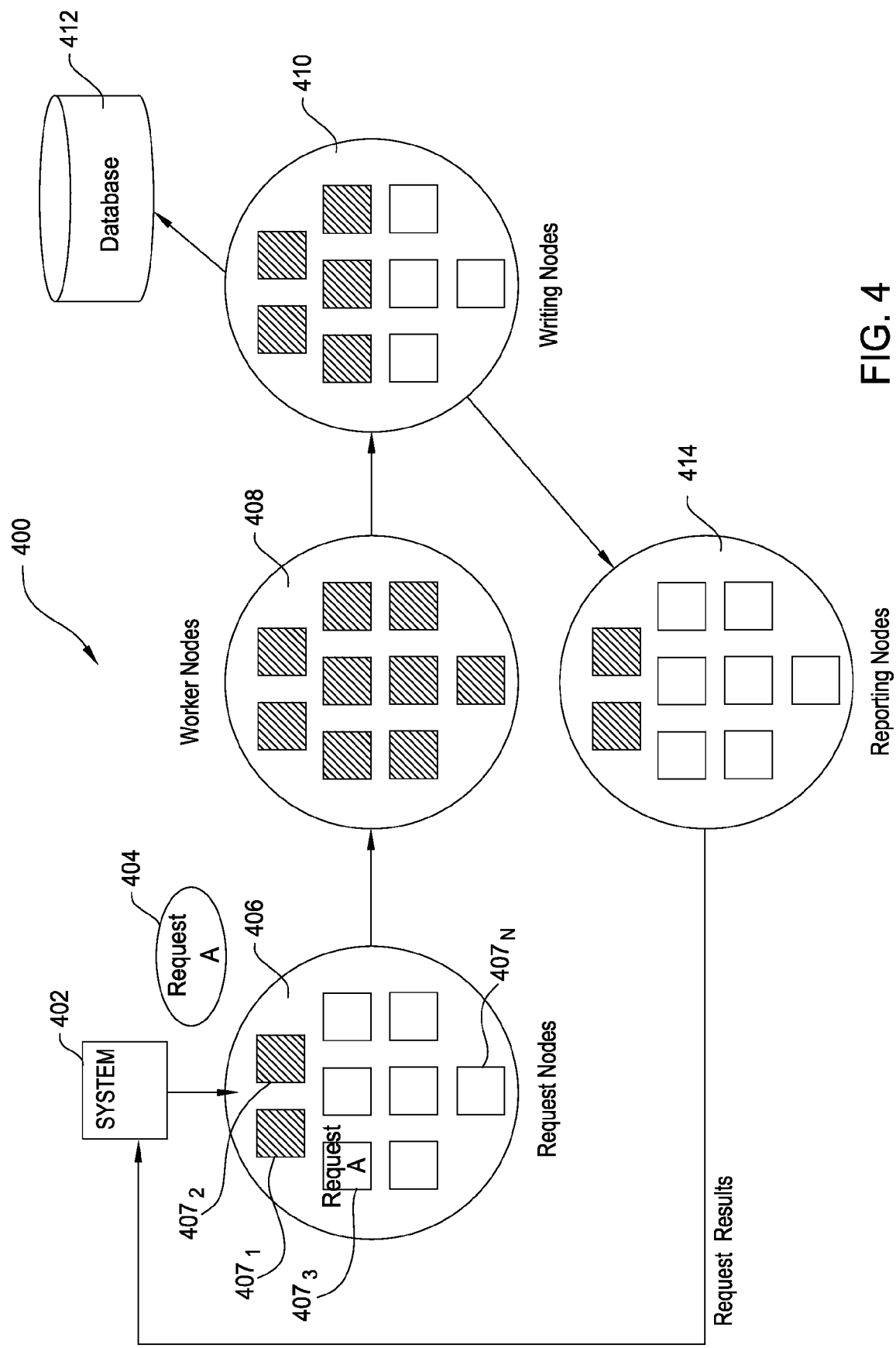
FIG. 4 illustrates an example of a process being migrated from one compute node to another, according to one embodiment of the invention

FIG. 4 illustrates an example of a process being migrated from one compute node to another, according to one embodiment of the invention. As shown, a computing system 402 sends a request "A" 404 to a nodal pool 406, which process requests. Illustratively, pool 406 includes nodes $407_1$ through $407_N$. Nodes $407_1$ and $407_2$ are busy (represented as a darkened square) processing other requests, and request "A" 404 is assigned to be processed by node $407_3$. Once node $407_3$ processes the request, the application running on node $407_3$ may be configured to attempt to transmit request "A" 404 to nodal pool 408, containing the worker nodes. However, in this example, each compute node in pool 408 is busy processing other requests. In response, in one embodiment, node $407_3$ may continue to perform task "A" 404 until it is incapable of proceeding further. In doing so, the node $407_3$ may be able complete a portion of the primary task assigned to the nodes in nodal pool 408. In the interim, however, one of the nodes of the nodal pool 408 may become available. If so, the partially completed request may be transmitted to a then available compute node of nodal pool 408. Otherwise, the partially completed request may be queued to wait for a node of nodal pool 408. Thereafter, request "A" 404 is sent to nodal pool 410, where database 412 is modified. Because nodal pool 410 contains idle nodes, it is able to process the request. Request "A" 404 is then sent to nodal pool 414, which is configured to generate presentation results for the user, e.g., database query results.

In one embodiment, however, a running task may decide to not migrate a partially completed task because the cost of migration is higher than just restarting the execution of the task on the remote nodes. For example, node $407_3$ may be able to perform so little of the task assigned to the nodes in nodal pool 408 that it is more efficient for the remote node to perform the complete task, as opposed to migrating and restarting the partially performed task.

Figure 5:
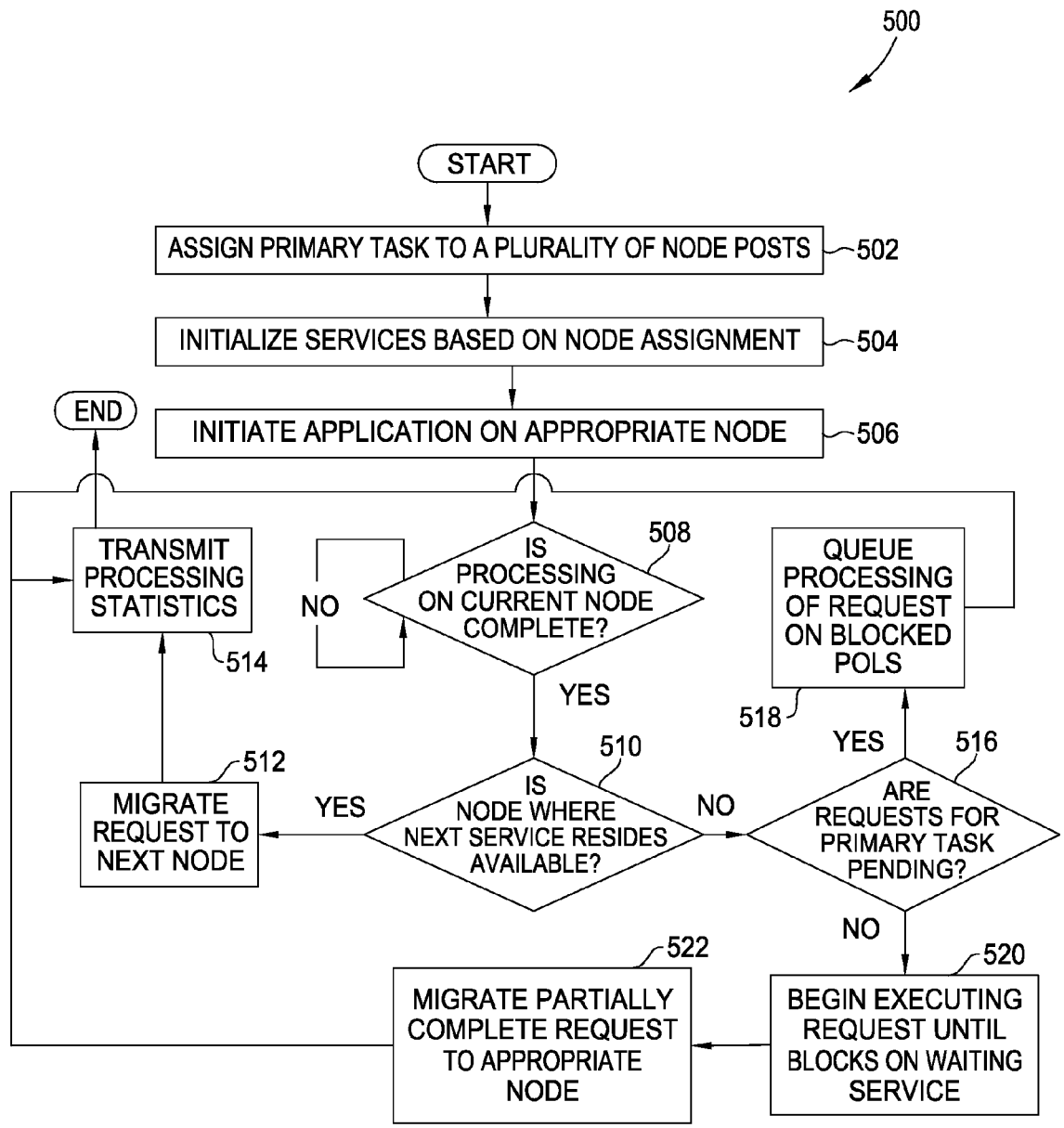
FIG. 5 is a flow diagram illustrating a method for migrating a process from one compute node to another based on service availability, according to one embodiment of the invention.

FIG. 5 is a flow diagram illustrating a method 500 for migrating a process from one compute node to another based on service availability, according to one embodiment of the invention. As shown, the method 500 begins at step 502 where a primary task may be assigned to each of a plurality of nodal pools. Using the scenario described above as an example, a database application may include a pool of nodes assigned to receiving database requests, a pool of nodes assigned to request processing, a pool of nodes assigned to accessing disk-based database storage, and a pool of nodes assigned to generate presentation results.

At 504, the nodes assigned to a given pool may initialize services based on the nodal assignments. For example, I/O nodes could initialize connections to a disk-base database, while another pool of nodes could each retrieve a portion of database data to use in evaluating database requests. Of course, the particular services available from a given node may be tailored to suit the needs of a particular case. At step 506, a distributed application may begin executing on the group of node pools. Again using the database example, at step 508, a node in the receiving pool may receive a request from a user to execute a database query. In response, the node may perform any query pre-processing (e.g., validating user authority to execute the query or confirming that query syntax or semantics are valid). Thus, as computing tasks are submitted for execution, the application distributed to each node may be configured to perform the general task assigned to that node as part of processing a given request. As stated, however, in one embodiment, each node may perform some portion of a task assigned to other nodes when the nodes assigned to performing that particular task are otherwise occupied. Accordingly, program code may be distributed to each node (or each node may be configured to access program code) for performing tasks assigned to other nodes.

Alternatively, as described in greater detail below in conjunction with a discussion of FIGS. 6 and 7, the application distributed to the nodes may include exception handling configured to allow a given node to migrate from one node to another, based on an exception event occurring when a service required by the application is not available on the node which the application is then currently executing. In such a case, the application may begin executing on any given node and then migrate too other nodes, as appropriate, based on different exception events that occur.

At step 508, the node processes a given request until the completing the task assigned to that node. At step 510, the node may attempt to send the request to a node in a pool configured to perform a subsequent stage of request processing. If a node from that pool is available, the request is migrated at step 512 and the processing statistics are returned at 514. If a node from the next pool of nodes is not available at step 510, then at step 516, the node may determine whether the nodal pool has any other primary tasks pending for the nodes of that pool. That is, the node may determine whether other requests are pending for the primary task assigned to the pool to which the node is assigned. If other primary tasks are pending, then at step 518, the node may queue the currently completed request for processing by another node pool and begin processing a pending primary request. At step 514, statistics of service availability may be transmitted to a service node. For example, as described above, an application running on a service node may be configured to evaluate statistics describing node use to help determine an appropriate distribution of nodes to different nodal pools.

If no primary tasks are pending, then at step 520, the node may attempt to continue processing the request until it blocks on a request for a service (or other resource) that is not available to the nodes in the current pool. Using the distributed database application as an example, the node configured to perform database operations may not have access to a network connection to disk-based database storage; nevertheless such a node may continue processing a given request until reaching a point where an actual write to disk occurs. Once blocked on a request for a required service not available on the current node, the partially completed request may be migrated to the appropriate node at 522, and processing statistics may be transmitted at 514.

FIG. 6 illustrates another example of a process being migrated from one compute node to another, according to one embodiment of the invention. As shown, a computing system 602 sends a task "A" 604 to a first nodal pool 606. Also as shown, nodal pool 606 includes a set of nodes $607_{1-N}$, where nodes $607_{1-2}$ are currently processing other submitted requests. Accordingly, task "A" 604 is transmitted to node $607_3$ to begin executing.

In this example, the nodal pool 606 represents a pool of nodes configured to receive and begin processing requests. Further, in this embodiment, node $607_3$ processes task "A" 604 until executing a statement in task "A" 604 that the node $607_3$ is unable to process. For example, node $607_3$ may not have access to a necessary service, may not have access to a particular network port, may not have access to a particular resource (e.g., database records), or may simply lack the necessary security privileges to perform a given operation. When this occurs, task "A" 604 may be configured to throw an exception detailing what service is needed to continue executing. In response, an exception handling routine may identify what service is identified in the exception, identify what node (or pool of nodes) the service is available from, migrate task "A" 704 to that node (or node in that pool of nodes), and retry the event that caused the initial exception. Thus, in this approach, the application continues to run until throwing an exception indicating a required service is not available at the current node and then migrate itself to a node where the required service is available. This approach may be useful where, for example, there is not a well-defined sequence of tasks used to process a given request; rather, in such a case, an application may jump from node-to-node as appropriate to process the request.

Illustratively, FIG. 6 shows an example of two alternate paths through a set of node pools 606, 608, 610, and 614. In a first path, represented by solid lines, task "A" 604 executes on the pool of request nodes 606 until throwing an exception. In response, an exception handling routine migrates the task "A" 604 to a node in pool of worker nodes 608. In a second path, represented by dashed lines, task "A" 604 also executes until migrating to the pool of worker nodes 608. However, at this point the paths diverge. In the first path, task "A" 604 executes until throwing another exception. In this case, task "A" 604 executes until attempting to write to database files not accessible by nodes in the pool of worker nodes 608. Accordingly, the exception handling routine migrates task "A" 604 to a node provided by the pool of database writing nodes 610 where the results determined by one of the worker nodes is written to a database 612. From there, task "A" 604 executes until another exception occurs and the exception handling routine migrates this task to a node in the pool of reporting nodes 614. In this example, task "A" 604 executes on the node in the pool of reporting nodes 614 to generate and return request results to computer system 602.

In the alternative path represented by dashed lines, task "A" is migrated from the pool of worker nodes 608 to a node in the pool of reporting nodes 614. This could occur, for example, where the results generated while task "A" is executed on a node in the pool of worker nodes 608 do not need to be written in to the database 612. Task "A" 604 then executes on a node in the pool of reporting nodes 614 to generate and return results to the computer system 602.

FIG. 7 is a flow diagram illustrating a method 700 for migrating a process request based on the service availability and location, according to one embodiment of the invention. As shown, method 700 begins at step 702 where a compute node receives an application to execute. At step 704, the application begins executing, and subsequently executes a set of instructions which may throw an exception. At step 706, the application program may determine whether an exception was thrown, and if so, whether the exception occurred due to a needed service being unavailable on the node which the application program is then currently running. If no exception is thrown, then at step 714, the application program may return to step 704 to continue running, or eventually, complete. Once completed, at step 712, service availability statistics may be gathered and transmitted to a service node.

Returning to step 706, if executing the sequence of instructions does result in an exception being thrown due to service unavailability, an exception handling routine may be invoked to catch and process the exception. At step 708, the exception handling routine may identify a node (or pool of nodes) where the requested service is available. At step 710, the process may be migrated to the node (or node in the pool) identified at step 708. Optionally, at step 712, the exception handling routing may gather and transmit service availability statistics to the service node. Thereafter, the application may continue running on the node to which it was migrated, until completed or until another exception is thrown due to service availability, in which case, the application may again be migrated to another node.

Advantageously, embodiments of the invention may be used to migrate a process on a highly distributed parallel computing system. As described herein, when a first compute node in a first pool is ready to hand-off a task to second pool for further processing, the first compute node may first determine whether a node is available in the second pool. And if no node is available in the second pool, then the first compute node may begin performing a primary task assigned to the second pool of nodes, up to the point where a service available exclusively to the nodes of the second pool is required. In the interim, however, one of the nodes of the second pool may become available. In another embodiment, an application program running on a compute node may be configured with an exception handling routine that catches exceptions and migrates the application to a node where a necessary service is available, as such exceptions occur.

While the foregoing is directed to embodiments of the present invention, other and further embodiments of the invention may be devised without departing from the basic scope thereof, and the scope thereof is determined by the claims that follow.

What is claimed is:

1. A computer-implemented method of migrating processes on a parallel computing system having a plurality of compute nodes, comprising:
    assigning a first primary task to a first nodal pool;
    assigning a second primary task to a second nodal pool, wherein the first and second nodal pools each include a specified number of compute nodes, wherein each compute node in the first nodal pool is available to perform (i) the first primary task and (ii) at least a portion of the second primary task, and wherein the second primary task requires access to a service available to each compute node included in the second nodal pool;
    in response to receiving a computing request, performing, by a first compute node of the first nodal pool, the first primary task;
    upon performing the first primary task, determining whether a compute node of the second nodal pool is available to perform the second primary task;
    upon determining a compute node of the second nodal pool is not available, performing, by the first compute node, at least the portion of the second primary task; and
    migrating a partially performed second primary task to a node of the second nodal pool where execution of the partially performed second primary task will be resumed.

2. The method of claim 1, further comprising:
    once the first compute node performs the portion of the second primary task, queuing the partially performed second primary task for completion by the node of the second nodal pool.

3. The method of claim 1, further comprising:
    prior to performing, by the first compute node, the portion of the second primary task, determining that no pending requests to perform the first primary task assigned to the first nodal pool are available to be performed.

4. The method of claim 1, further comprising, collecting statistical data indicating how frequently a compute node of the second nodal pool is determined to not be available to perform the second primary task.

5. The method of claim 4, wherein the statistical data further indicates how frequently a node in the second nodal pool is available after the first compute node performs the portion of the second primary task.

6. The method of claim 1, wherein the service is a database service.

7. The method of claim 1, wherein the service is a network service.

8. A non-transitory computer-readable storage medium containing a program which, when executed performs an operation for migrating processes on a parallel computing system having a plurality of compute nodes, the operation comprising:
    assigning a first primary task to a first nodal pool;
    assigning a second primary task to a second nodal pool, wherein the first and second nodal pools each include a specified number of compute nodes, wherein each compute node in the first nodal pool is available to perform (i) the first primary task and (ii) at least a portion of the second primary task, and wherein the second primary task requires access to a service available to each compute node included in the second nodal pool;
    in response to receiving a computing request, performing, by a first compute node of the first nodal pool, the first primary task;
    upon performing the first primary task, determining whether a compute node of the second nodal pool is available to perform the second primary task;
    upon determining a compute node of the second nodal pool is not available, performing, by the first compute node, at least the portion of the second primary task; and
    migrating a partially performed second primary task to a node of the second nodal pool where execution of the partially performed second primary task will be resumed.

9. The computer-readable storage medium of claim 8, wherein the operation further comprises:

once the first compute node performs the portion of the second primary task, queuing the partially performed second primary task for completion by the node of the second nodal pool.

10. The computer-readable storage medium of claim 8, wherein the operation further comprises:

prior to performing, by the first compute node, the portion of the second primary task, determining that no pending requests to perform the first primary task assigned to the first nodal pool are available to be performed.

11. The computer-readable storage medium of claim 8, wherein the operation further comprises, collecting statistical data indicating how frequently a compute node of the second nodal pool is determined to not be available to perform the second primary task.

12. The computer-readable storage medium of claim 11, wherein the statistical data further indicates how frequently a node in the second nodal pool is available after the first compute node performs the portion of the second primary task.

13. The computer-readable storage medium of claim 8, wherein the service is a database service.

14. The computer-readable storage medium of claim 8, wherein the service is a network service.

15. A parallel computing system, comprising:

a plurality of compute nodes, each having at least a processor and a memory;

a service node having at least a processor and a memory, wherein the service node is configured to assign a first primary task to a first nodal pool and to assign assigning a second primary task to a second nodal pool, wherein the first and second nodal pools each include a specified number of compute nodes, wherein each compute node in the first nodal pool is available to perform (i) the first primary task and (ii) at least a portion of the second primary task, and wherein the second primary task requires access to a service available to each compute node included in the second nodal pool; and a first compute node, assigned to the first nodal pool, wherein the first compute node executes a program, which when executed on the processor of the first compute node is configured to:

in response to receiving a computing request, perform the first primary task, upon performing the first primary task, determine whether a compute node of the second nodal pool is available to perform the second primary task, and upon determining a compute node of the second nodal pool is not available, perform at least the portion of the second primary task; and migrating a partially performed second primary task to a node of the second nodal pool where execution of the partially performed second primary task will be resumed.

16. The parallel computing system of claim 15, wherein the program is further configured to:

once the first compute node performs the portion of the second primary task, queue the partially performed second primary task for completion by the node of the second nodal pool.

17. The parallel computing system of claim 15, wherein the program is further configured to:

prior to performing, by the first compute node, the portion of the second primary task, determine that no pending requests to perform the first primary task assigned to the first nodal pool are available to be performed.

18. The parallel computing system of claim 15, wherein the program is further configured to collect statistical data indicating how frequently a compute node of the second nodal pool is determined to not be available to perform the second primary task.

19. The parallel computing system of claim 18, wherein the statistical data further indicates how frequently a node in the second nodal pool is available after the first compute node performs the portion of the second primary task.

20. The parallel computing system of claim 15, wherein the service is a database service.

21. The parallel computing system of claim 15, wherein the service is a network service.

* * * * *